(12) United States Patent
Kowaleski et al.

(10) Patent No.: US 6,479,791 B1
(45) Date of Patent: Nov. 12, 2002

(54) DYNAMIC VOLTAGE SENSING WITH FAILURE INDICATION

(75) Inventors: Anthony J. Kowaleski, Manawa, WI (US); Jeffery R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 32 days.

(21) Appl. No.: 09/853,355

(22) Filed: May 11, 2001

(51) Int. Cl.[7] .............................................. B23K 9/095
(52) U.S. Cl. .............................. 219/130.31; 219/137 PS
(58) Field of Search ........................ 219/130.21, 130.31, 219/130.32, 130.33, 137 PS

(56) References Cited

U.S. PATENT DOCUMENTS 4,521,672 A * 6/1985 Fronius ................. 219/130.33

OTHER PUBLICATIONS

Miller® MAXTRON™ 300 Owner's Manual Jul. 1992.

* cited by examiner

*Primary Examiner*—Clifford C. Shaw
(74) *Attorney, Agent, or Firm*—George R. Corrigan

(57) ABSTRACT

A method and apparatus for welding is disclosed. The welding system includes a power supply and a controller. The power supply has a control input and a power output. The controller has a control output connected to the controller. It also has two feedback inputs connected to two sources of feedback of a welding parameter. A dynamic feedback source selector is connected to the two sources of feedback. A feedback source user indicator is connected to and responsive to the dynamic feedback source selector. The method includes providing and controlling welding power. Feedback of a welding parameter is sensed from two sources. The source to be used to control the power supply is dynamically selected. Also, and indication is provided to the user if the source of feedback selected changes.

26 Claims, 2 Drawing Sheets

DYNAMIC VOLTAGE SENSING WITH FAILURE INDICATION

FIELD OF THE INVENTION

The present invention relates generally to the art of welding power supplies. More specifically, it relates to welding power supplies with feedback selected from more than one source.

BACKGROUND OF THE INVENTION

There are many types of welding systems used for a variety of applications. Typical prior art welding systems include a power supply, such as phase control, inverter and converter based power supplies, and a controller that controls the output of the power supply.

Prior art controllers use a number of fedback parameters, including output current and output voltage. Output voltage, as used herein, includes the output voltage of a power supply, either at the power supply, or at a remote location such as the workpiece.

When output voltage is the fedback parameter it is known in the prior art to feedback either power supply voltage or voltage from sense leads connected to the workpiece or bench, and the wire feed motor. Power supply voltage, as used herein, includes output voltage in or near the power supply, such as on the output studs. Voltage sense lead, as used herein, includes one or more leads used to sense output voltage remotely from the power supply, such as at the workpiece and/or the wire feeder.

The power supply voltage may differ from a sense lead voltage because of losses in the welding cable. Often, the power supply voltage is sufficient to control the power supply. Other times a more accurate voltage feedback is desired, and sense leads are used.

Sense leads typically connect to a specially designated sensor on the welding power supply. The negative voltage sense lead is typically clamped or clipped onto the workpiece or workbench, and the positive voltage sense lead is typically connected to the wire feed motor. The sense leads often lay on the ground between the welding power supply and the workpiece.

Users can select whether power supply voltage or sense lead voltage is used for feedback. Alternatively, some inverter based prior art welding systems, such as the Miller Maxtron™, automatically select the source of feedback. Specifically, the feedback from both sources are ORED together such that if a valid output voltage feedback is on the sense lead, then the sense lead voltage is used as the feedback control. Alternatively, if there is no valid output voltage feedback on the sense lead, then the welding power supply voltage is used as the feedback voltage. Valid output voltage feedback, as used herein, includes signals indicative of output voltages provide during a weld or open circuit condition.

Because the Maxtron™ continuously monitors of the sense lead voltage and the power supply voltage the source of the feedback can change during a welding process. This may be necessary if the sense lead feedback is interrupted. The sense lead feedback may be interrupted because the sense lead can be inadvertently removed from the workpiece, or the lead itself can be damaged, such as by being run over.

However, the user does not know the source of feedback has changed, and this may adversely affect the welding process. Because the user does not know the source of feedback has changed, the user does not have the opportunity to reconnect or replace the sense lead.

Accordingly, a welding power supply that receives feedback from multiple sources and that the selects the source of feedback, and notifies the user of the source selected and/or a change in the source of feedback, is desirable. Preferably, such a welding power supply can be used with a phase control power supply.

SUMMARY OF THE PRESENT INVENTION

According to a first aspect of the invention a welding system includes a power supply and a controller. The power supply has at least one control input and a power output. The controller has at least one control output connected to the controller. It also has two feedback inputs connected to two sources of feedback of a welding parameter. A dynamic feedback source selector is connected to the two sources of feedback. A feedback source user indicator is connected to and responsive to the dynamic feedback source selector.

A second aspect of the invention is a method of welding including providing and controlling welding power. Feedback of a welding parameter is sensed from two sources. The source to be used to control the power supply is dynamically selected. Also, and indication is provided to the user if the source of feedback selected changes.

The sources of feedback are voltage feedback in one embodiment. One source is power supply voltage, and the other voltage sense lead in various embodiments.

The dynamic feedback source selector includes software that selects the power supply voltage if the sense lead voltage is not valid feedback, and selects the sense lead voltage if it is valid feedback in yet another embodiment.

The controller includes a microprocessor, and at least a part of the dynamic feedback source selector is implemented with software and may include noise filtering software in other embodiments.

The feedback source user indicator includes software that activates a user indicator at the completion of a weld process, if the selection changed during the weld process in another alternative.

The power supply is a phase controlled power supply in another embodiment.

According to a third aspect of the invention a system for welding includes a phase controlled power supply a that has a control input and a power output. A microprocessor based controller provides a control output to the power supply. Two feedback inputs are connected to two sources of feedback of a welding parameter. A software based dynamic feedback source selector includes noise filtering.

Other principal features and advantages of the invention will become apparent to those skilled in the art upon review of the following drawings, the detailed description and the appended claims.

Figure 1:
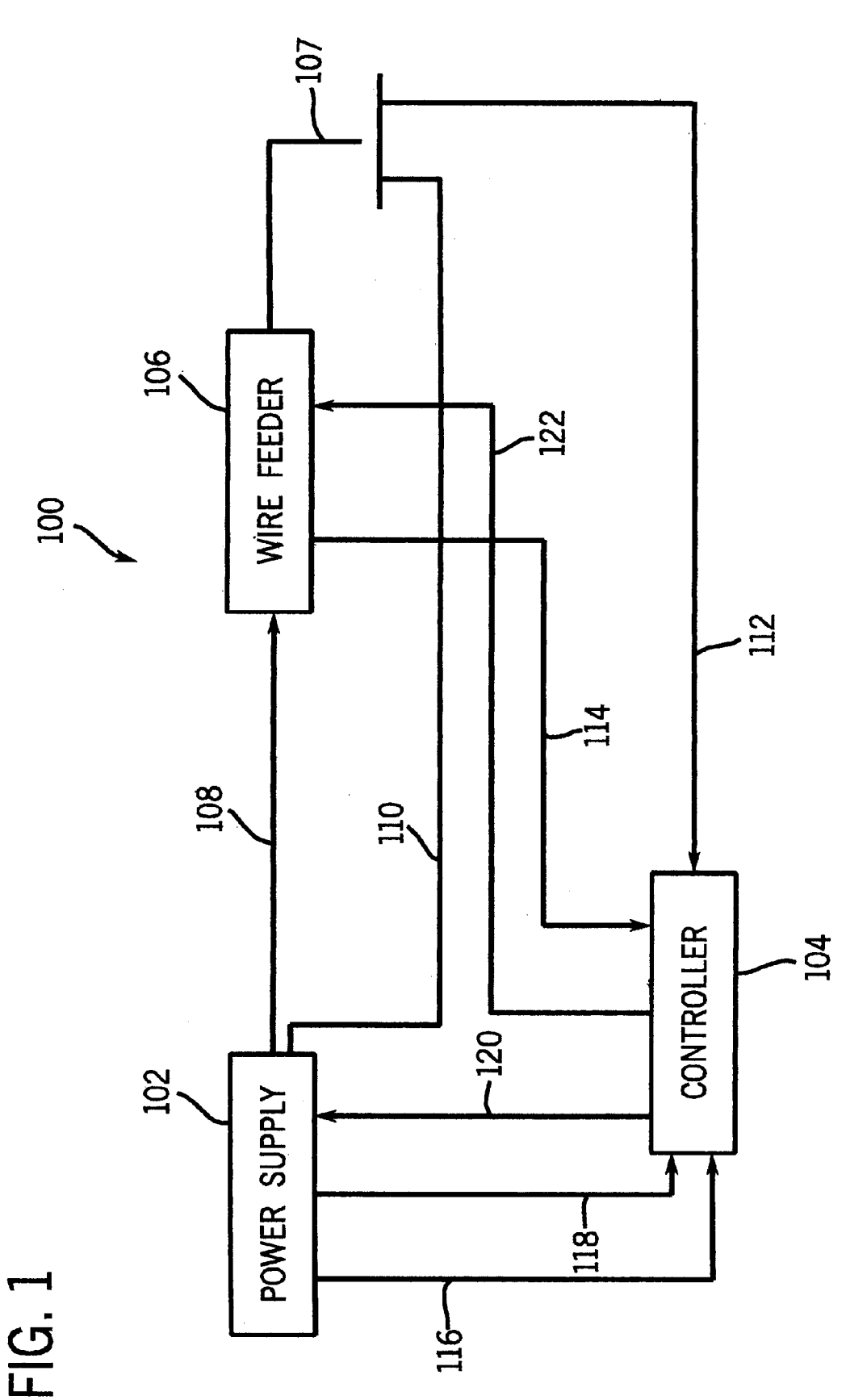
FIG. 1 is diagram of a welding power supply constructed in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular components and a particular welding power supply, used in a particular environment, it should be understood at the outset that the invention may also be implemented with other components, power supplies, and used in different environments.

Generally, the invention provides for a welding system that has two potential sources of welding parameter feedback. The system automatically selects the preferred the source of feedback. If the preferred source of feedback is used during the course of a weld, and then becomes unavailable during that weld, the system notifies the user of the change. Welding parameter, as used herein, includes an output parameter such as current, voltage, power, frequency, or other parameter, and functions thereof, such as derivatives, integrals, multiplications, etc.

More specifically, in accordance with the preferred embodiment, the welding system receives voltage feedback from the either the power supply, or from sense leads. If a valid output voltage feedback exists on the sense lead, then the sense lead is used as the source of feedback. If a valid output voltage feedback does not exist on the sense lead, then the feedback is power supply voltage. As the presence or absence of valid output voltage feedback on the sense lead changes, the source of feedback is reselected, even during a welding process. Thus, the system dynamically selects the source of feedback. Dynamically selects, as used herein, includes making and changing a selection during a welding process.

If, during the course of a welding process, a valid output voltage feedback ceases to exist on the sense lead, the user is notified of the change at the completion of the weld process. (Completion of a weld process, as used herein, includes an intentional ending of the arc, the completion of the weld on the piece, or an interruption of the arc that causes the process to stop.)

A welding system 100, shown in FIG. 1, includes a power supply 102, a controller 104, and a wire feed or 106 which cooperate to provide power to a welding arc 107. System for welding, or welding system, as used herein, includes one or more of a power supply, controller, wire feeder, and source of gas, it may also include peripherals such as robots etc.

Power supply 102 and controller 104 may be disposed to in a single housing, or may be disposed separate housings. Likewise, wire feeder 106 may be in the housing of power supply 102 and controller 104, or a separate housing. Power supply 102 and controller 104, and wire feeder 106 are implemented with a phase controlled power supply, such as a Miller DeltaWeld™ welder, and a Miller 60™ series wire feeder. Of course, this invention may readily be used with other types of welders, welding power supplies, including switched power supplies, and other wire feeders.

Power supply 102 provides power on line 108 to wire feeder 106. The return path for the welding current is line 110, which is connected to the workpiece or bench. Power supply 102 receives one or more control signals on a control input from line 120 from controller 104. Control input, as used herein, includes an input used to control a power supply, such as a setpoint, gate signals, phase control signals, etc. Power supply 102 provides the desired output power in accordance with the control signals received from controller 104.

Wire feeder 106 receives the power on cable 108 and provides wire and power to arc 107 in a conventional manner. Wire feeder 106 may also be controlled by controller 104, using control signals provided on line 122. A portion of controller 104 may be disposed within wire feeder 106.

Controller 104 is software based, and includes, in the preferred embodiment, a microprocessor with software or instructions to carry out typical control functions, as well as the control functions specifically used to implement this invention.

Controller, as used herein, includes digital and analog, circuitry, discrete or integrated circuitry, microprocessors, DSPs, etc., and software, hardware and firmware, located on one or more boards, used to control a device such as a power supply. Software, as used herein, includes instructions to a microprocessor or other digital circuit. Software based, as used herein, includes performing at least some of a function with software.

Controller 102 provides a control output to power supply 102 on line 120. Control output, as used herein, includes an output used to control a power supply, such as a setpoint, gate signals, phase control signals, etc.

Controller 102 receives two feedback inputs and is connected to two sources of feedback. Feedback is received from power supply 102 on lines 116 and 118, as well as on voltage sense leads 112 and 122 from the workpiece and wire feeder 106, respectively. Feedback input, as used herein, includes an input indicative of the value of a fedback parameter. Connected to a source of feedback, as used herein, includes receiving a signal or information indicative of the value of the fedback parameter at the source. Both feedback inputs are output voltage in the preferred embodiment, although other welding parameters may be used as well, and are used in carrying out other functions of controller 104.

Controller 104 uses software to monitor the output voltage fed back from power supply 102 and on sense leads 112 and 122. Controller 104 selects feedback from sense leads 112 and 122 if the voltage fed back is valid. Controller 104 determines if the voltage fed back is valid by comparing the voltage thereon to a threshold. The threshold is selected so that an arc voltage will be greater than the threshold. Thus, if the sense the voltage is less than the threshold (about 10 volts in the preferred embodiment), sense leads 112 and 122 are not sensing arc voltage, and voltage feedback from power supply 102 is used.

Controller 104 includes noise filtering software, such as time delays and/or averaging software or hardware to filter noise out of the feedback signal. This helps avoid inadvertently switching feedback sources. Noise filtering software, as used herein, includes software filters noise.

The software and circuitry of controller 104 that select between the two feedback sources during the welding process are called a dynamic feedback source selector. Dynamic feedback source selector, as used herein, includes a portion of a controller that selects one of a plurality of feedback sources as the source used to control, wherein the selection may be made and changed during the welding process.

Controller 104 also keeps track of changes in the source of voltage feedback. Specifically, in the preferred embodiment, if feedback is obtained from sense leads 112 and 122, and then the feedback on sense leads 112 and 122 becomes unavailable, a user indicator is activated to notify the user of the change. User indicator, as used herein, includes notifying the user, such as by an audible signal, (beeps whistles, etc.), by a visual signal, (LED, display panel, printed message, etc.), a network message, or by other methods.

The user is notified, in the preferred embodiment, by a feedback source user indicator, such as a message on the display panel of welding power supply 102. The user feedback source indicator is connected to the dynamic feedback source selector. Connected, us used herein, includes physical connections such as wires and through components, and operatively connected, such as software. Alternative notifications include lighting and LED, providing an audible alarm, said sending a message (such as an e-mail message if controller 104 is networked).

The software that performs the feedback selection is written in C in the preferred embodiment and is as follows:

```
if( State == STANDBY)
{
    Cntrl_Counter = 0;
    Ad_volt_Source = AD_VOLT_14;
    VSense_time_out = 0;
}
if( ( State == WELD ) && ( Cntrl_counter <5 ) )
    Ad_volt_source == AD_VOLT_SENSE;
if( ( State == WELD ) && ( Cntrl_counter >= 5 ) )
{
    if( Ad_volt_source == AD_VOLT_SENSE)
    {
        if( new_voltage < MIN_ARC_VOLTS )
        {
            Vsense_time_out++;
        }
        else
            Vsense_time_out = 0;
        if( Vsense_time out > 10 )
        {
            Ad_volt_Source == AD_VOLT_14;
            If(Cntrl_counter > 20)
                Vsense_change_Counter++;
        }
    }
    if( ( Vsense_change_counter > 1 ) &&
        ( Ad_volt_Source == AD_VOLT 14))
    {
        Vsense_change_counter = 0;
    }
}
```

Where State is the status of system 100, i.e., welding or standby, Cntrl_Counter is a delay counter, Ad_volt_Source is the selected source of feedback, AD VOLT_14 indicates the power supply voltage, AD_VOLT_SENSE indicates the sense lead voltage, VSense_time_out is a delay counter. new_voltage is the fedback voltage, MIN_ARC_VOLTS is the threshold below which the sense lead feedback is not valid. Vsense time_out is a delay counter, and Vsense_change_Counter keeps track of changes in the selected feedback source. This routine provides a delay from switching off of using the sense leads end of feedback source to out filter noise, as described above.

Figure 2:
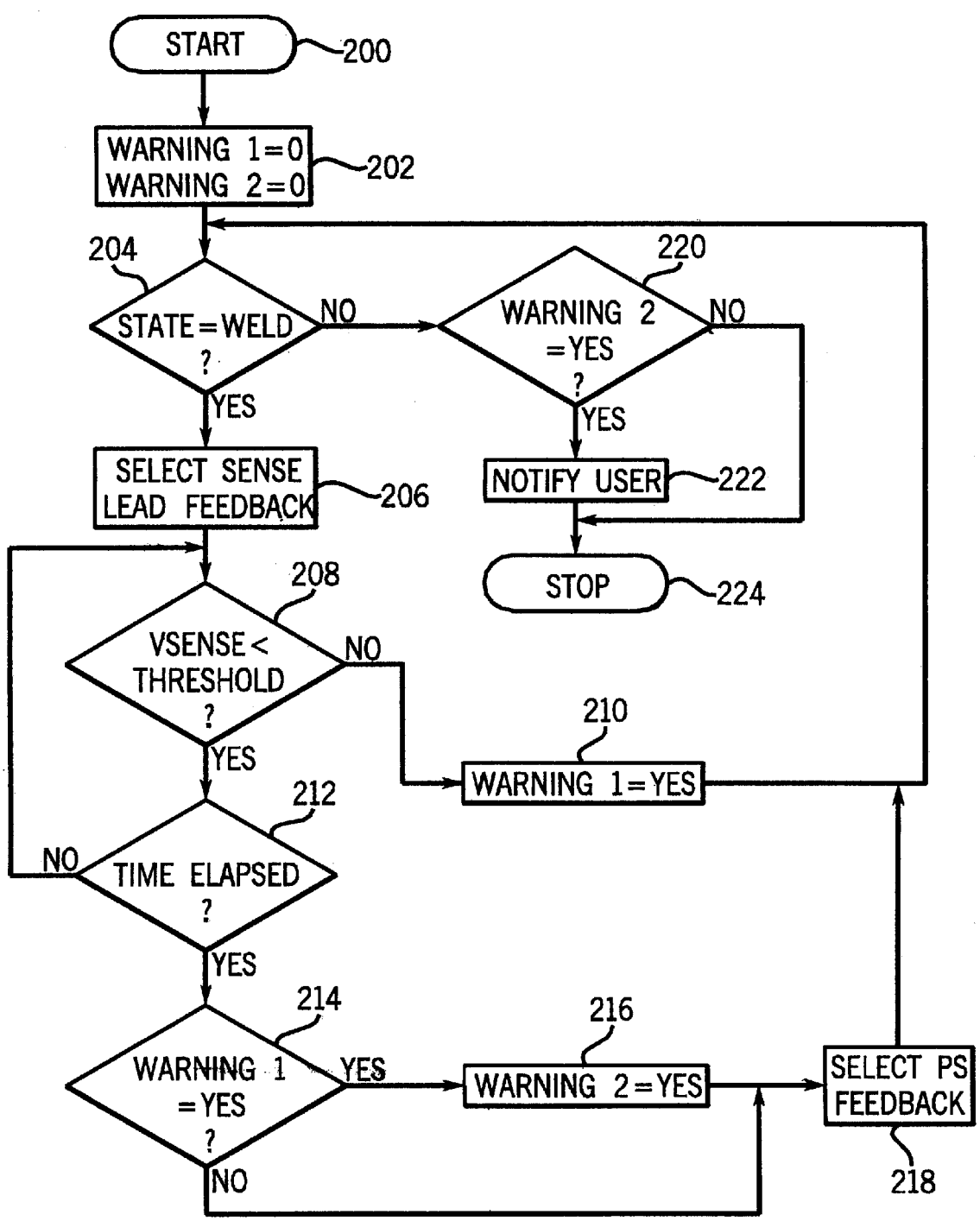
FIG. 2 is a flow chart in accordance with the present invention.

An alternative implementation is shown by the flowchart of FIG. 2. Of course, other routines, flowcharts, and processes, as well as analog circuitry may easily be used. Referring now to FIG. 2, the flowchart begins at 200 and at 202 to warning flags are set to 0 (or null). The state of welding system 100, welding or standby, is checked at 204. If welding is occurring, voltage feedback from the sense leads is selected at 206. The feedback voltage from the sense leads is compared to a threshold at 208.

If the sense lead voltage is not less than the threshold, indicating the sense leads provide valid feedback, then warning flag 1 is set to yes at 210. The process returns to check the state to a system 100 at 204. Warning flag 1 is used to determine, along with warning flag 2, whether not the user should be notified of loss of sense lead feedback.

If the sense lead voltage is less than the threshold at 208, indicating the sense leads do not have valid feedback, time elapsed is checked at 212 to provide for a noise filtering delay. If sufficient time has elapsed while the sense lead voltage is less than the threshold, the state of warning flag 1 is checked at 214. If warning flag 1 is yes, then warning flag 2 is also set to yes at 216. If warning flag 1 is not yes, then warning flag to his not set. In either case, power supply feedback is selected at 218. Then, the process returns to check the state of welding system 100 at 204.

If the state of welding system 100 is determined to be standby at 204, indicating the welding process has ended, then the state of warning flag 2 is checked at 220. If warning flag 2 is set to yes, indicating feedback from. the sense leads was lost, the user is notified at step 222. The process ends at 224.

The invention contemplates numerous alternatives, including implementing the dynamic feedback source selector with hardware, analog or digital circuitry, discrete or integrated circuits. Also, the fedback parameter could be current, power, or any other welding parameter. The validity of the sense lead feedback could be determined using a different parameter than is fedback—current for example. The two sources need not provide the same welding parameter. The sense lead need not be the default, or preferred, source. The user could specify the default source, and the dynamic feedback source selector changes only if that source is not valid (and then notify the user). The dynamic feedback selector may be located remotely from controller 104, such as in wire feeder 106.

Numerous modifications may be made to the present invention which still fall within the intended scope hereof. Thus, it should be apparent that there has been provided in accordance with the present invention a method and apparatus for a welding power supply with multiple feedback sources that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A system for welding comprising;
   a power supply having at least one control input and a power output;
   a controller, having
   at least one control output connected to the at least one control input,
   a first feedback input connected to a first source of feedback of a welding parameter,
   a second feedback input connected to a second source of feedback of the welding parameter, and
   a dynamic feedback source selector connected to the first and second sources of feedback; and
   a feedback source user indicator responsive to the dynamic feedback source selector.

2. The system of claim 1, wherein the first and second sources of feedback of a welding parameter are first and second sources of feedback of an output voltage.

3. The system of claim 2, wherein the first source of feedback is a source of power supply voltage.

4. The system of claim 3, wherein the second source of feedback is at least one voltage sense lead.

5. The system of claim 4, wherein the dynamic feedback source selector includes software that selects the source of power supply voltage in the event the at least one voltage sense lead does not provide valid output voltage feedback, and selects the at least one voltage sense lead in the event the at least one voltage sense lead provides valid output voltage feedback.

6. The system of claim 1, wherein the controller includes a microprocessor, and at least a part of the, dynamic feedback source selector is implemented with software.

7. The system of claim 6, wherein the feedback source user indicator includes software that activates a user indicator at the completion of a weld process in the event the selection changed during the weld process.

8. The system of claim 6, wherein the dynamic feedback source selector includes noise filtering software.

9. The system of claim 1, wherein the power supply is a phase controlled power supply and the at least, one control output includes a phase control signal.

10. A system for welding comprising;
    a power supply means for providing welding power and for receiving at least one control input;
    control means, connected to the power supply means, for controlling the power supply means,
    wherein the control means includes means for receiving feedback of a welding parameter from first and second sources, and,
    further wherein the control means includes means for dynamically selecting one of the first and second sources of feedback and providing a signal indicating the selection; and
    means, connected to the means for dynamically selecting, for indicating to the user if the selected source of feedback changes, responsive to the dynamic feedback source selector.

11. The system of claim 10, wherein the first and second sources of feedback of a welding parameter are first and second means for providing feedback of an output voltage.

12. The system of claim 11, wherein the first means for providing feedback is a means for feeding back power supply voltage.

13. The system of claim 12, wherein the second means for providing feedback is a means for feeding back voltage from at least one voltage sense lead.

14. The system of claim 10, wherein the control means includes means for processing digital signals, and at least a part of the means for dynamically selecting includes software.

15. The system of claim 14, wherein the means for dynamic selecting includes means for selecting the means for feeding back power supply voltage in the event the means for feeding back voltage from at least one voltage sense lead does not provides valid output voltage feedback, and for selecting the means for feeding back voltage from at least one voltage sense lead in the event the means for feeding back voltage from at least one voltage sense lead provides valid output voltage feedback.

16. The system of claim 15, wherein the means for indicating includes means for activating a user indicator at the completion of a weld process.

17. The system of claim 15, wherein the means for dynamically selecting includes means for filtering noise.

18. A method for welding comprising;
    providing welding power;
    controlling the welding power;
    sensing a first signal from a first source of feedback of a welding parameter,
    sensing a second signal from a second source of feedback of the welding parameter, and
    dynamically selecting one of the first and second sources of feedback as a feedback to be used to control the power supply; and
    indicating to the user if the source of feedback selected changes.

19. The method of claim 18, wherein sensing a first and second signal includes sensing first and second signals indicative of an output voltage.

20. The method of claim 19, wherein the first signal is indicative of a power supply voltage.

21. The method of claim 20, wherein the second signal is indicative of at least one sense lead voltage.

22. The method of claim 21, wherein dynamic selecting, includes selecting the signal indicative of a power supply voltage in the event the at least one sense lead voltage does not provide valid output voltage feedback, and selecting the signal indicative of the at least one sense lead voltage provides valid output voltage feedback.

23. The method of claim 18 wherein indicating includes activating a user indicator at the completion of a weld process.

24. The method of claim 23, wherein dynamic selecting includes filtering noise.

25. The method of claim 18, controlling includes phase controlling.

26. A system for welding comprising;
    a phase controlled power supply having at least one control input and a power output;
    a controller, including a microprocessor, having
    at least one control output connected to the at least one control input,
    a first feedback input connected to a first source of feedback of a welding parameter,
    a second feedback input connected to a second source of feedback of the welding parameter, and
    a software based dynamic feedback source selector, including noise filtering, connected to the first and second feedback inputs.

* * * * *